(No Model.)
J. RUPERTUS.
MACHINE FOR OVAL CUTTING SHEET METAL.
No. 332,214. Patented Dec. 8, 1885.
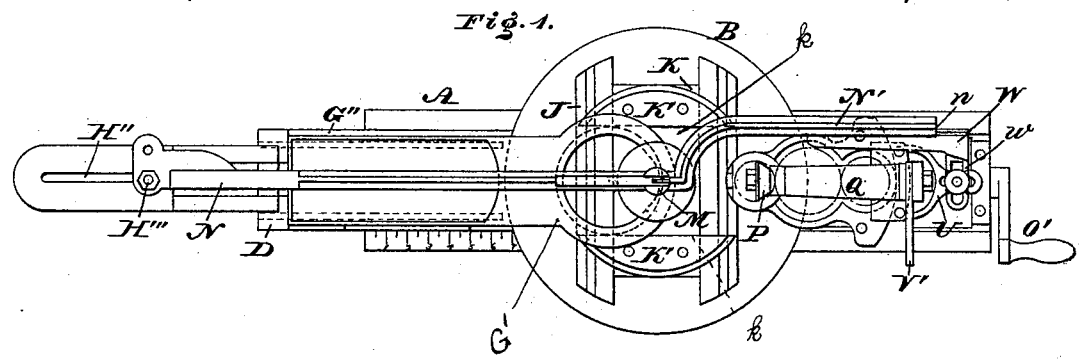
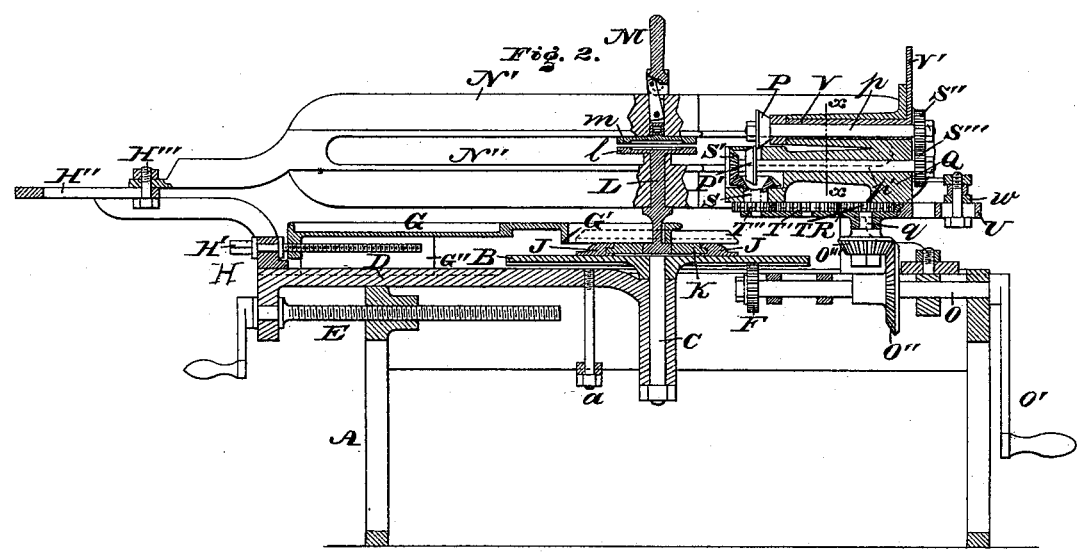
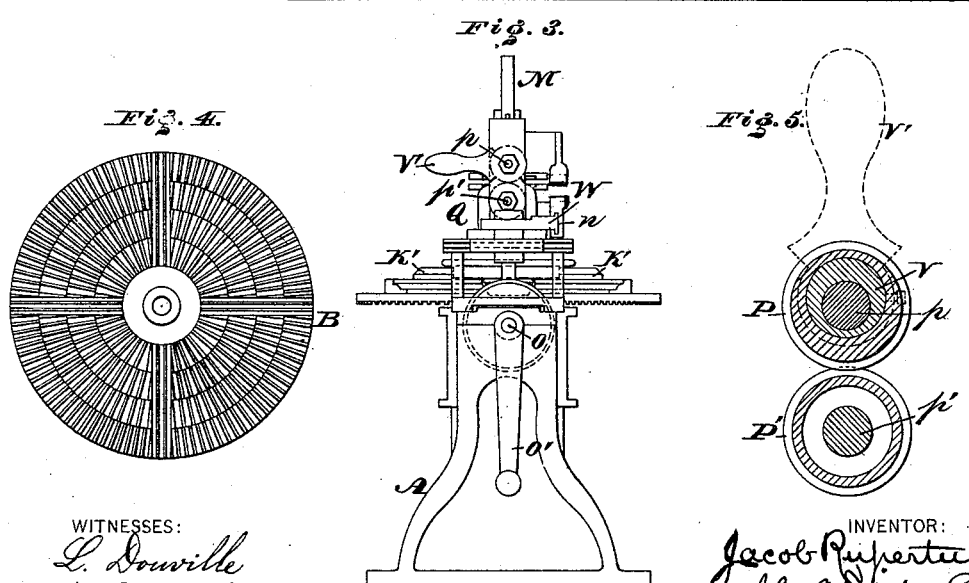
WITNESSES:
L. Douville
W. F. Kircher
INVENTOR:
Jacob Rupertus
BY John A. Wiedersheim
ATTORNEY.

UNITED STATES PATENT OFFICE.

JACOB RUPERTUS, OF PHILADELPHIA, PENNSYLVANIA, ASSIGNOR, BY DIRECT AND MESNE ASSIGNMENTS, TO FRANK HIGEL AND JOHN MALLO, BOTH OF SAME PLACE.

MACHINE FOR OVAL-CUTTING SHEET METAL.

SPECIFICATION forming part of Letters Patent No. 332,214, dated December 8, 1885.

Application filed September 24, 1884. Serial No. 143,858. (No model.)

*To all whom it may concern:*

Be it known that I, JACOB RUPERTUS, a citizen of the United States, residing in the city and county of Philadelphia, State of Pennsylvania, have invented a new and useful Improvement in Machines for Oval-Cutting Sheet Metal, &c., which improvement is fully set forth in the following specification and accompanying drawings, in which—

Figure 1 is a plan view of a machine embodying my invention. Fig. 2 is a vertical longitudinal section thereof. Fig. 3 is an end view thereof. Fig. 4 is a bottom view of the rotating chuck. Fig. 5 is a section on line $x$ $x$, Fig. 2, enlarged.

Similar letters of reference indicate corresponding parts in the several figures.

My invention relates to improvements in oval-cutting machines for sheet metal, &c.; and it consists, first, in providing means by which the cutters are caused to vibrate for making a cut tangential to the curve presented; secondly, of improved means by which one of the cutters can be raised, for the purpose of cutting gaskets or other similar work; and, thirdly, in details hereinafter fully set forth.

Referring to the drawings, A represents a suitable frame, on which the different parts are mounted.

B represents a chuck or disk rotating on pin or shaft C, vertically journaled in sliding frame D. The chuck has on its under surface a series of differential gearing. On two diameters and at right angles to each other this gearing is uniform across the face, as shown in Fig. 4, so that when the sliding frame D is moved by means of the tail-screw E the pinion F will permit the lateral movement of the chuck.

Rigidly secured to the upper side of the chuck B are two parallel bars, J J, having grooves on their inner sides. Between these parallel bars is a slide or plate, K, having flanges fitting the grooves in the bars J J, the top of the plate K being flush with the top of the bars. Rigidly connected to the plate and at right angles to the bars are pieces or gibs K' K', the end portions of which ride freely upon the bars, the inner faces, $k$ $k$, thereof bearing against the outer edge of the downward-projecting circular flange G' of the sliding frame G. The said frame G is adjustably secured by screw H' to an extension or projection, H, of the frame D, and has dependent flanges G'', which work in grooves in the said frame, thus securing greater steadiness and accuracy in the working of the device. A scale or gage may be placed on frame D to aid in the adjustment of the frame G.

Pivotally secured at H''' in a slotted horizontal portion, H'', of the projection H is a bifurcated or forked bar or support, N. The forks of this support are curved near their centers, as shown in Fig. 1.

Vertically journaled in the lower fork, N'', is a shaft, L, having a holding plate or center, $l$, to support the material to be cut, the foot of the shaft L being rigidly secured in the center of the sliding plate K. The upper fork, N', has secured thereto a cam-lever, M, which forces the clamping-plate $m$ down upon the material, thus firmly securing it in place.

O represents a shaft journaled in the frame A, and operated by a handle, O'. On the end of this shaft is a pinion, F, meshing with the gearing on the under face of the chuck B.

The cutting device consists of two rotary shears or knives, P P', mounted on shafts $p$ $p'$, properly journaled in a casing, Q, which is pivotally secured at $q$ to the frame R. The shafts are rotated by means of a series of gear-wheels consisting of bevel-wheel O'' on shaft O, bevel-wheel O''' on a small vertical shaft, pinions T T' T'', and bevel-wheels S S', the latter rigidly attached on shaft $p'$. This shaft is connected to shaft $p$ by gearing S'' S'''.

In order that the shears may adapt their cutting-edges to all the varying lines of the oval or other form to be cut as they are presented, the fork N'' has in its inner face near the end a groove, $n$, for the reception of a block, W, having a slotted portion, $w$, which is clamped to a forked arm or projection of the case Q. The upper shaft, $p$, has within the casing Q an eccentric inclosing-sleeve, which, by means of the lever V', raises the upper cutter out of the way, so that the material may pass beneath and parallel ovals be cut, which is of great importance and convenience in cutting gaskets.

The operation of the machine is as follows: If a circular pattern is to be cut, the slide G is so adjusted by means of screw H' that the center of the circle of the flange G' and the center of the chuck B will coincide.

To vary the size of the pattern, the frame D is adjusted by means of the tail-screw E, the securing-bolt $a$ being first loosened, and the chuck B having been rotated until the uniform gearing on its under face is in such position as to permit the movement of the same on the pinion F. The material is placed between the plates $l$ and $m$, and clamped therein by means of the lever M, and the rotating and cutting gearings operated by the handle O' on shaft O.

In cutting a pattern of an oval form, the eccentricity is regulated by varying the distance of the center of the circle of the flange G' from the center of the chuck B, which is done by means of the screw H'. When the shaft O is revolved and the chuck rotated by means of pinion F, working in one of the gears on its under side of the chuck, the slide K is moved in the grooves of bars J J by means of the gibs K' K' thereon, being guided by the flange G', by reason of the contact of their inner faces, $k\ k$, with the outer faces of the said flange G. The vertical shaft L, rigidly secured at the center of the slide K, will thus describe an oval of the eccentricity required, and the material between plates $l$ and $m$ will be presented to the shears on the lines to be cut. The shaft L, being secured in the fork N' of the bar, will in its operation cause the forked bar N to vibrate or have a reciprocal motion in the direction of its length, as well as a swinging motion on the pivot H'''. This motion is communicated to the case Q, inclosing the shafts, on which the shears are mounted by means of the block W, working in groove $n$, and its connections with the arm U of the said case Q, thus causing the case to oscillate on pivot $q$, and (the pivoted frame Q having been properly adjusted by means of the clamping device to the slotted piece $w$) the shears to make a cut tangential to the lines presented by the action of the rotating chuck and reciprocal bar. The aforesaid adjustment of the pivoted frame is determined by the action of the respective parts when in operation.

Having thus described my invention, what I claim as new, and desire to secure by Letters Patent, is—

1. In an oval-cutting machine, the chuck B, having on its under side differential gears, and on two diameters at right angles across the same side thereof gearing uniform with said differential gearing, whereby a pinion may readily pass from one of the differential gears to another thereof, substantially as and for the purpose set forth.

2. In an oval-cutting machine, the rotating chuck B, having on its upper face parallel bars for the working therein of a slide, substantially as described.

3. In an oval-cutting machine, a vibrating and reciprocating bar carrying the material to be cut, in combination with knives or cutters suitably mounted on revolving shafts having bearings in a pivoted vibrating casing, substantially as and for the purpose set forth.

4. In an oval-cutting machine, a vibrating and reciprocating bar, in combination with knives or cutters suitably mounted on revolving shafts connected by gearing to the main driving-shaft and a pivoted casing, the said revolving shafts having bearings in said pivoted casing, which are connected to the said vibrating bar, substantially as and for the purpose set forth.

5. Means substantially as described for describing an elliptical form, in combination with a holding device, a cutting device, and a pivoted casing, the said cutting device being mounted on shafts having bearings in said pivoted casing, and the said pivoted casing being properly connected with the said holding device, whereby a cut tangential to the line presented is made, substantially as described.

6. The frame D, in combination with the rotating chuck B, plate K, having gibs K' K', and an adjustable frame, G, having flange G', substantially as described.

7. The rotating chuck B, in combination with plate K and frame G, having flange G', substantially as described.

8. The sliding frame D, in combination with chuck B, means for rotating said chuck, plate K, adjustable frame G, and forked bar N, pivotally secured in slot of projection H, substantially as described.

9. The frame A, in combination with sliding frame D and chuck B, having on its under side differential gears and on two diameters at right angles across the same face gearing uniform with the differential gearing, substantially as described.

10. In an oval-cutting machine, the forked bar N, having a groove, $n$, in one of its forks, in combination with block W, having slotted attachment $w$, and casing Q, having arm U, substantially as described.

11. In an oval-cutting machine, the chuck B, in combination with slide K, adjustable frame G, having flange G', and pivoted forked bar N, having shaft L, journaled in the lower fork, N'', the lower end of said shaft L being rigidly secured in the center of the plate K, substantially as described.

12. In an oval-cutting machine, the frame A, in combination with chuck B, frame D, slide K, adjustable frame G, having flange G', pivoted forked holding-bar N, a cutting device, means for presenting the edges of cutting shears or knives of the cutting device tangentially to the lines of the ovals to be cut, and means for operating said chuck and cutting device, substantially as described.

13. In an oval-cutting machine, a vibrating and reciprocating bar having a groove therein, in combination with a block sliding in said groove and provided with a slotted portion, and a pivoted case carrying rotary knives, the case having an arm which is adjustably clamped to a projection of the said block, whereby a cut tangential to the oval described may be made, substantially as described.

JACOB RUPERTUS.

Witnesses:
JOHN A. WIEDERSHEIM,
JNO. K. PLITT.